US012552385B2

(12) United States Patent
Hoffmann et al.

(10) Patent No.: US 12,552,385 B2
(45) Date of Patent: Feb. 17, 2026

(54) METHOD FOR CONTROLLING A TORQUE OF AT LEAST ONE WHEEL USING A TRAINED RADIAL BASIS FUNCTION NETWORK

(71) Applicant: Robert Bosch GmbH, Stuttgart (DE)

(72) Inventors: Kai Hoffmann, Ilsfeld (DE); Marco Stumm, Ludwigsburg (DE); Michael Erden, Bietigheim-Bissingen (DE); Rami Scharbak, Benningen (DE); Valentin Loeffelmann, Dielheim (DE); Dirk Weidmann, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 327 days.

(21) Appl. No.: 17/917,663

(22) PCT Filed: Aug. 3, 2021

(86) PCT No.: PCT/EP2021/071602
§ 371 (c)(1),
(2) Date: Oct. 7, 2022

(87) PCT Pub. No.: WO2022/078649
PCT Pub. Date: Apr. 21, 2022

(65) Prior Publication Data
US 2023/0118756 A1    Apr. 20, 2023

(30) Foreign Application Priority Data
Oct. 14, 2020   (DE) .............. 10 2020 212 946.0

(51) Int. Cl.
*B60T 8/174*    (2006.01)
*B60T 8/175*    (2006.01)
(Continued)

(52) U.S. Cl.
CPC ............. *B60W 30/18172* (2013.01); *B60W 2510/0661* (2013.01); *B60W 2520/26* (2013.01);
(Continued)

(58) Field of Classification Search
CPC ... B60W 30/18172; B60W 2510/0661; B60W 2520/26; B60W 2520/30;
(Continued)

(56) References Cited

U.S. PATENT DOCUMENTS 10,275,662 B1 * 4/2019 Askeland ............ G06V 20/56
12,151,516 B2 * 11/2024 Doraiswamy ........ G08G 1/22
(Continued)

FOREIGN PATENT DOCUMENTS

CN     103558764 A  *  2/2014
CN     111142534 A  *  5/2020  .......... G05D 1/0223
(Continued)

OTHER PUBLICATIONS

Mirzaeinejad, Hossein, Robust predictive control of wheel slip in antilock braking systems based on radial basis function neural network, 2018, Applied Soft Computing, 70, 318-329 (Year: 2018).*
(Continued)

*Primary Examiner* — Jelani A Smith
*Assistant Examiner* — George A Alcorn, III
(74) *Attorney, Agent, or Firm* — NORTON ROSE FULBRIGHT US LLP

(57) ABSTRACT

A method for controlling a torque of at least one wheel of a mobile platform. The method includes: providing at least one current slip value of the wheel and at least one current wheel acceleration of the wheel as input values; providing a trained radial basis function network designed to determine, by means of the input values, at least one torque change as an output value for control of the at least one wheel; and
(Continued)

determining a current torque change, by means of the trained radial basis function network and the provided input values, for control of the torque.

14 Claims, 2 Drawing Sheets

(51) Int. Cl.
    *B60W 30/18*     (2012.01)
    *G06N 20/00*     (2019.01)
(52) U.S. Cl.
    CPC . *B60W 2520/30* (2013.01); *B60W 2710/0666* (2013.01); *B60W 2720/26* (2013.01); *B60W 2720/30* (2013.01)
(58) Field of Classification Search
    CPC ..... B60W 2710/0666; B60W 2720/26; B60W 2720/30; B60T 8/175; B60T 8/174; B60T 2270/86; G06N 20/00; B60Y 2400/81
    USPC .......................................................... 701/84
    See application file for complete search history.

(56) References Cited

U.S. PATENT DOCUMENTS

| | | | | |
|---|---|---|---|---|
| 2009/0093928 | A1* | 4/2009 | Getman | G01S 15/931 |
| | | | | 701/37 |
| 2010/0312448 | A1* | 12/2010 | Kueperkoch | B60T 8/173 |
| | | | | 701/82 |
| 2019/0339688 | A1* | 11/2019 | Cella | H04L 1/18 |
| 2021/0331677 | A1* | 10/2021 | Kim | B60W 40/10 |
| 2023/0090923 | A1* | 3/2023 | Tione | B61L 15/0081 |
| | | | | 701/69 |

FOREIGN PATENT DOCUMENTS

| | | |
|---|---|---|
| CN | 111211724 A | 5/2020 |
| DE | 19527323 A1 | 1/1997 |
| DE | 102018112718 A1 | 7/2018 |
| EP | 985586 A2 | 3/2000 |
| JP | H04314634 A | 11/1992 |
| JP | H1119136 A | 1/1999 |
| JP | 2000118374 A | 4/2000 |
| JP | 3584669 B2 * | 11/2004 |

OTHER PUBLICATIONS

International Search Report for PCT/EP2021/071602, Issued Oct. 21, 2021.

* cited by examiner

METHOD FOR CONTROLLING A TORQUE OF AT LEAST ONE WHEEL USING A TRAINED RADIAL BASIS FUNCTION NETWORK

BACKGROUND INFORMATION

Vehicle dynamics control systems are used to control the driving states of vehicles as a function of a current slip between a wheel and the road surface, for example in order to achieve the best possible transmission of force between the wheel and a road surface or to stabilize the driving state.

Vehicle dynamics control systems intervene in the driving dynamics of the vehicle; for example by changing a brake pressure or an engine torque. Such control interventions can be accomplished with the aid of an electronic stability program (ESP), brake slip control/anti-lock braking system (ABS) or traction control system/anti-slip regulation (ASR).

Such vehicle dynamics control systems have to be extensively calibrated according to specific requirements for comfort and braking behavior for each new type of vehicle, wherein different road surface conditions have to be taken into account as well.

SUMMARY

The present invention provides a method for controlling a torque of at least one wheel of a mobile platform, a method for training a radial basis function network for estimating a torque change, a use of the method for calibration, a control device, a computer program and a use of the control device, which achieve the abovementioned objects at least in part. Advantageous configurations of the present invention are disclosed herein.

Throughout this description of the present invention, the sequence of method steps is presented in such a way that the method is easy to follow. However, those skilled in the art will recognize that many of the method steps can also be carried out in a different order and lead to the same or a corresponding result. In this respect, the order of the method steps can be changed accordingly.

According to one aspect of the present invention, a method for controlling a torque of at least one wheel of a mobile platform is provided. According to an example embodiment of the present invention, the method includes the following steps:

In one step, at least one current slip value of the wheel and at least one current wheel acceleration of the wheel are provided as input values. In a further step, a trained radial basis function network is provided, which is configured to determine, by means of the input values, at least one torque change as an output value for control of the at least one wheel. In a further step, a current torque change is determined by means of the trained radial basis function network and the provided input values for controlling the torque.

A radial basis function network (RBF network) is a special layered artificial neural network that uses nonlinear radial basis functions as activation functions and comprises an input layer and an output layer and a layer of hidden neurons with the RBF activation function. The nonlinear RBF activation function, which is dependent only on the distance from a central vector, can be radially symmetrical about that vector. In other words, the radial basis function depends only on the distance to a given center. Input values for the RBF network can be modeled as a vector of real numbers, for example. The output of the RBF network is typically a linear and/or sigmoidal combination of radial basis functions of the inputs and neuron parameters (weights w).

The hidden layer can comprise a number of neurons with a respective central vector for each neuron. The linear output layer can comprise an output neuron to which the neurons are respectively functionally connected via a weight w. Typically, all of the inputs are connected to every hidden neuron. The norm for the distance of an input value from the respective central vector can be defined as a Euclidean and/or quadratic distance and/or L0 norm and/or L1 norm and/or L2 norm and the radial basis function, which can be defined with any function, such as a linear function, a sigmoidal function or a quadratic function, can in particular be defined as a Gaussian distribution function and accordingly depends only on the distance to the given center of the neurons.

RBF networks can be trained using error feedback methods or gradient methods.

A wheel acceleration of the wheel corresponds to an angular acceleration of the wheel, or an acceleration of a point on a circumference of the wheel.

The torque change is a change in torque which, like a braking torque, acts to brake the at least one wheel, and/or a change in torque which, like an engine torque, acts to accelerate the at least one wheel.

The feature of control should be broadly interpreted and includes both control in the narrower sense and regulation of the torque of the at least one wheel of the mobile platform.

This example method according to the present invention can be used to simplify and automate a calibration of a brake controller, for example, wherein the method provides reproducible determinations of the current torque change by using the trained radial basis function network, as opposed to a deep neural network.

The example method can in particular also be adapted to other complex controllers, so that a "time to market" can be reduced.

Determining a current change in torque with the trained radial basis function network in this example method of the present invention advantageously achieves that an absolutely smaller value for the change in torque has to be determined or estimated by the radial basis function network, which enables a more accurate determination of the torque change. Moreover, a more stable control of the torque can be achieved with the determined current torque change, since unstable determinations in particular can be more readily identified and filtered.

The provided method according to the present invention can advantageously be used for slip control with an anti-lock braking system, for example. Alternatively or additionally, the proposed method can be used for slip control in a traction control system (TCS).

Determining the current torque change using the trained radial basis function network advantageously makes it possible to provide a robust and reproducible control of the torque of the at least one wheel of the mobile platform, because, due to its simple structure, the trained radial basis function network can be analyzed in terms of the functional relationships.

The use of a radial basis function network to determine a current torque change in particular enables a state space to be divided into multiple regions corresponding to the practical application of a control of a torque of the wheel on different surfaces and, since a nonlinear relationship can consequently be presented transparently, thus enables a reproducible state action assignment.

Using an RBF architecture for the method furthermore makes it possible to apply an adaptation and extension with different parameters and other input variables to almost any control problem, and is thus particularly flexible.

Moreover, a radial basis function network has favorable statistical properties to control the torque.

According to one aspect of the present invention, it is provided that the above-described example method determines a current torque by adding the determined torque change to a current torque of the wheel.

According to one aspect of the present invention, it is provided that the above-described example method determines a brake pressure and/or a brake pressure change by calculating the determined torque and/or the determined torque change respectively using a functional relationship between the torque and the brake pressure.

According to one aspect of the present invention, it is provided that the provided input values for the trained radial basis function network additionally comprise a first sequence of previous values of a normal force of the wheel and a second sequence of previous torque values to determine the current torque change. The use of further input value types enables an improved determination of the current torque change.

According to one aspect of the present invention, it is provided that the provided input values for the trained radial basis function network consist of the current slip value of the wheel and the current wheel acceleration of the wheel and a first sequence of previous values of a normal force of the wheel and a second sequence of previous torque values, and wherein the current torque change is determined by means of a radial basis function network trained with these four input value types.

With these four input value types, an overall state of the mobile platform can advantageously be characterized particularly well, in particular to adapt the control of the torque to different surfaces and environmental conditions, and the resulting different friction values and normal forces, with appropriate training of the radial basis function network using these four input value types. With these four input value types, different driving scenarios can be mapped in the state space of the radial basis function network and thus enable a comprehensible state action assignment to determine a correspondingly correct current torque change using the proposed method. A nonlinear relationship can therefore be presented transparently.

The first sequence and the second sequence of previous values can pertain to the corresponding values of the input value types over the last and/or past time steps, and can in particular be filtered over the last n time steps to make the control of the torque more robust and stable.

According to one aspect of the present invention, it is provided that the input values comprise a current coefficient of friction of the wheel; and/or a current torque of the wheel; and/or a running average of the torque of the wheel; and/or a current change in torque over time and/or a gradient of the torque of the wheel; and/or an average of the torque of the wheel; and/or a current torque of at least one other wheel of the mobile platform; and/or a normal force of at least the wheel and a normal force of at least one other wheel of the platform; and/or a difference between the current slip and a target slip; and/or dynamic values of the mobile platform and/or a current change in wheel acceleration over time and/or a normal force of at least one other wheel of the mobile platform and/or a current slip value and at least one current wheel acceleration of another wheel of the platform.

The dynamics of the mobile platform can be characterized by a yaw rate of the mobile platform and/or an acceleration of the mobile platform and/or a steering angle of the mobile platform.

According to one aspect of the present invention, it is provided that the provided trained radial basis function network is configured to additionally determine, by means of the input values, a change in the engine torque as an output value for control of the torque of the at least one wheel, and the trained radial basis function network also determines a change in the engine torque as the output value for control of the torque of the at least one wheel.

By controlling or regulating both a driving and a braking torque by means of an engine torque and/or a braking torque, a dynamic behavior and/or a traction of the mobile platform can be influenced within limits and both an optimized braking behavior and comfort requirements for a steering behavior and/or a braking behavior can be taken into consideration for the control or regulation.

This control of the torque change with respect to both a braking torque and a driving torque also applies in particular to the control or regulation of the torque with the above-described only four input value types as input variables.

According to an example embodiment of the present invention, a method for training a radial basis function network for estimating a torque change of at least one wheel of a mobile platform is provided, which comprises the following steps: In one step, a slip value of the wheel is provided. In a further step, a wheel acceleration of the wheel associated with the slip value is provided. In a further step, input values for the radial basis function network are formed with the slip value and the respective associated wheel acceleration. In a further step, a target torque change associated with the input values is provided and assigned. In a further step, the radial basis function network is trained with a plurality of different input values and the respectively assigned target torque changes for estimating the torque change using the input values.

This example method of the present invention for training the radial basis function network can be carried out online using the appropriately configured mobile platform and/or offline on appropriately configured training set-ups, such as brake test stands. In the case of online training, the control of the torque can then also be adapted to changing conditions, such as loading or changed tires.

According to an example embodiment of the present invention, in the method for training, a target torque change can be determined heuristically using rules by evaluating stored measured input values and controlled torque changes, for example from measurements on a brake test stand. In the event of deviations from a torque change rated as optimal, corresponding to a target torque change, parameters of the radial basis function network can be adapted using a gradient descent method.

For example, in the method for training, the torque change estimated by the radial basis function network can be evaluated heuristically, for example by determining an average brake slip $s_1$ over an interval comprising the time steps t to t+n in a first step.

In a further step, the average brake slip $s_1$ can be compared with a target slip $sl_{soll}$.

In a further step, an improved torque change a* can be calculated as a target torque change in a time step t−m by means of the Formula 1: $a^* = (a_{slsoll} - a_{sl}) * alpha$, wherein a is the actual proposed torque change and alpha is a heuristic factor.

In a further step, parameters of the radial basis function network, such as the weights w can be updated in the time step t−m using a gradient descent method and an error $(a^*-a)^2$.

Using an averaged brake slip enables this method to account for an inherent system delay during training. Alternatively or additionally, brake slip can be evaluated using a Savitzky-Golay filter. Alternatively or additionally, such an inherent system delay can also be explicitly taken into account using a time shift window.

For the evaluation of the estimated torque change, the first or second time derivative of the target slip can also be used to determine a target torque change using an adjusted Formula 1. The gradient with which the slip changes can thus be derived from the interval comprising the time steps t to t+n.

Alternatively or additionally, the torque change proposed by the radial basis function network can also be evaluated using the other input value types of the radial basis function network and their change over time according to the above presentation.

According to one aspect of the present invention, it is provided that the method for training the radial basis function network be carried out online using an appropriately configured control device of the mobile platform. Training the radial basis function network online allows a torque controller of the mobile platform to be trained more quickly and/or changes in the environment and/or the wheel, such as after a wheel change, to be incorporated into the training as well.

According to one aspect of the present invention, it is provided that the method for training the radial basis function network be carried out online, during a braking process.

In other words, during a braking process, parameters of the radial basis function network are adapted during a currently ongoing braking process to train the radial basis function network.

According to one aspect of the present invention, it is provided that the method for training the radial basis function network be carried out offline using stored measurement series of input values and output values, such as in particular torque changes on the at least one wheel. Other dynamic metrics of the mobile platform can also be stored and used for offline training. With offline training, it is advantageously possible to use greater computing power to optimize the radial basis function network.

According to one aspect of the present invention, it is provided that the provided input values for training the radial basis function network additionally comprise a first sequence of previous values of a normal force of the wheel and a second sequence of previous torque values.

According to one aspect of the present invention, it is provided that the provided input values for training the radial basis function network consist of the current slip value of the wheel and the current wheel acceleration of the wheel and a first sequence of previous values of a normal force of the wheel and a second sequence of previous torque values.

According to one aspect of the present invention, it is provided that the respective input values are additionally assigned an associated target change in the engine torque and the radial basis function network is trained with a plurality of different input values and respectively assigned target torque changes and assigned target change in the engine torque.

According to one aspect of the present invention, it is provided that the radial basis function network be provided with at least some of the above-described different types of input values and the radial basis function network be trained with a plurality of said input values and the respectively assigned target torque changes and/or target change in the engine torques to estimate the torque change and/or the change in the engine torque.

According to one aspect of the present invention, it is provided that the radial basis function network be configured on the basis of expert knowledge and/or physical boundary values prior to training to achieve improved training.

In addition to being able to configure the radial basis function network for training with random values and/or to set the position of the neurons evenly, expert knowledge can be used to set the radial basis function network to require less training and/or produce better estimates.

Expert knowledge can in particular be incorporated with regard to the number and distribution of the position of the neurons, by selecting the position of the neurons depending on physical limitations of respective input values and a desired granularity, corresponding to a desired accuracy of the estimate. The position of the neurons can in particular be selected unevenly within the limitations. This can in particular take into account whether a braking of the torque or/and a driving torque is to be controlled.

According to one aspect of the present invention, it is provided that the radial basis function network be configured on the basis of expert knowledge by means of an arrangement of centers of the radial basis function network in a state space and/or by means of a weighting of a plurality of centers of the radial basis function network.

According to an example embodiment of the present invention, a method is provided in which, based on the torque and/or engine torque determined using any one of the above-described methods, a control signal for controlling an at least partially automated vehicle is provided and/or, based on the determined torque and/or engine torque, a warning signal for warning a vehicle occupant is provided.

A control device of a mobile platform can thus, for example, control a braking torque or a braking force on at least one wheel to brake the mobile platform by forwarding the control signal to a brake actuator capable of acting on the at least one wheel.

With respect to the feature that a control signal is provided based on a determined torque and/or engine torque, the term "based on" is to be understood broadly. It is to be understood such that the determined torque and/or engine torque is used for every determination or calculation of a control signal, wherein this does not exclude that other input variables are used for this determination of the control signal as well. The same applies correspondingly to the provision of the warning signal.

According to an example embodiment of the present invention, a use of one of the above-described methods for calibrating a torque controller of a mobile platform is provided. The torque controller includes a controller for a braking torque and/or an engine torque.

According to an example embodiment of the present invention, a control device and/or computer program is provided, which is configured to carry out one of the above-described example methods. With such a device, the corresponding method can easily be integrated into different systems.

According to an example embodiment of the present invention, a use of the above-described control device for traction control of at least one wheel of the mobile platform is proposed.

According to a further aspect, a computer program is specified which comprises instructions that, when the computer program is executed by a computer, prompt said computer program to carry out one of the above-described example methods. Such computer program enables the described method to be used in different systems.

According to an example embodiment of the present invention, a machine-readable storage medium is specified, on which the above-described computer program is stored.

A mobile platform can be an at least partially automated system that is mobile and/or a driver assistance system. An example can be an at least partially automated vehicle or a vehicle comprising a driver assistance system. In other words, in this context, an at least partially automated system includes a mobile platform in terms of an at least partially automated functionality, but a mobile platform also includes vehicles and other mobile machines including driver assistance systems. Other examples of mobile platforms can be driver assistance systems comprising multiple sensors, mobile multi-sensor robots such as robot vacuum cleaners or lawnmowers, a multi-sensor monitoring system, a ship, an aircraft, a manufacturing machine, a personal assistant, or an access control system. Each of these systems can be a fully or partially autonomous system.

BRIEF DESCRIPTION OF THE DRAWINGS

Exemplary embodiments of the present invention are shown with reference to FIG. 1 and will be explained in more detail in the following.

DETAILED DESCRIPTION OF EXAMPLE EMBODIMENTS

Figure 1:
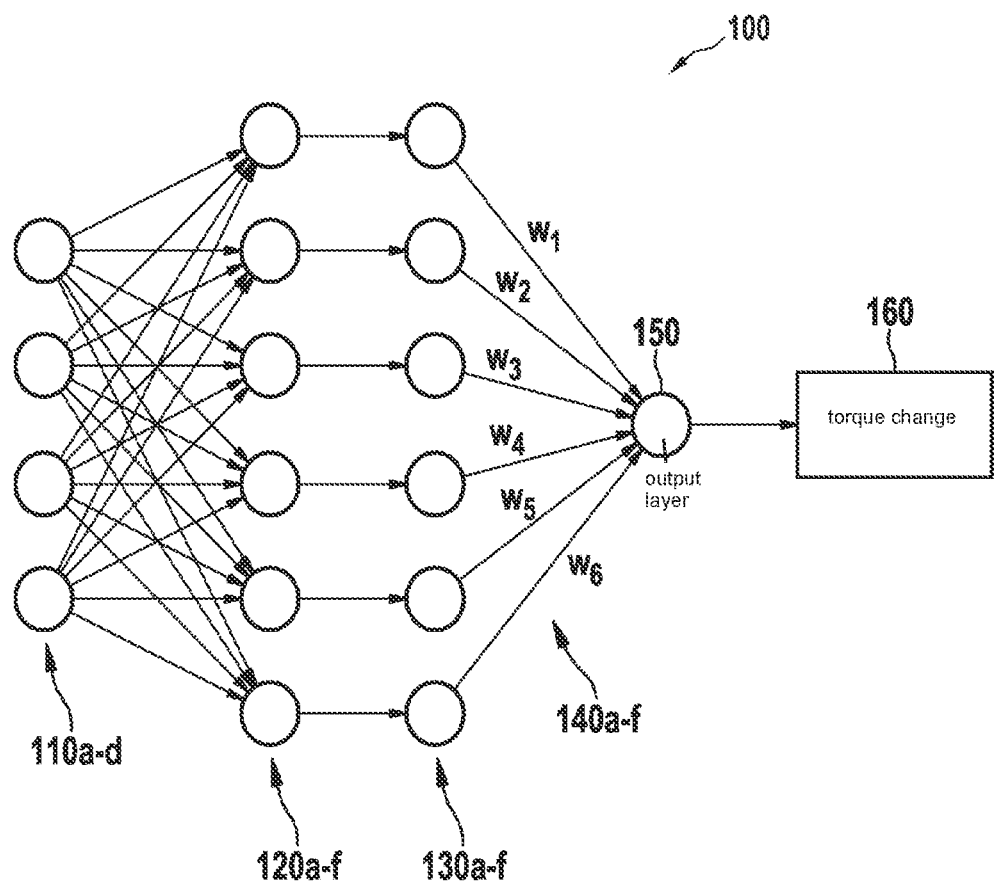
FIG. 1 shows a structure of a radial basis function network, according to an example embodiment of the present invention.

FIG. 1 is a schematic sketch of a structure of a radial basis function network 100 comprising an input layer 110a-d, a layer of hidden neurons 120a-f and an RBF activation function or transfer function 130a-f and an output layer 150. The different neurons 120a-f contribute to the output layer 150 according to weights w1 to w6 140a-f.

Such a radial basis function network 100 can be used for controlling a torque in that the radial basis function network 100 estimates a torque change 160 with input values.

To control a torque of at least one wheel of a mobile platform, a current slip value of the wheel and a current wheel acceleration of the wheel and a first sequence of previous values of a normal force of the wheel and a second sequence of previous torque values can be applied to the input layer 110a-d of the trained radial basis function network 100 as input values. The radial basis function network 100 trained with the input values 110a-d uses the applied input values to estimate a current torque change 160 for controlling the torque.

For this purpose, all of the input values 110a-d are normalized to a range of zero to one in one step.

In a further step, the distance between the signals of the input values and the neurons is calculated, wherein each neuron represents a specific point in a state space. A Euclidean distance metric is used to determine the distance. Alternatively or additionally, other distance metrics, such as an L1 distance metric, can be used as well.

The output of each neuron is a distance between a current state, namely the current input signal at time t, and the specific center of the neuron.

In a further step, the distance is transferred to the output layer 160 by means of the radial basis function f. This radial basis function f can be any function. The radial basis function can be a Gaussian distribution function, for example, that returns a high value when the input is close to zero and a low value when the input is high. The input in this case is the distance to the center. In other words, an output of each neuron is transformed with the radial basis function and, according to a linear regression, multiplied by a specific weight $w_n$ 140a-f and summed to estimate the torque change 160.

Figure 2:
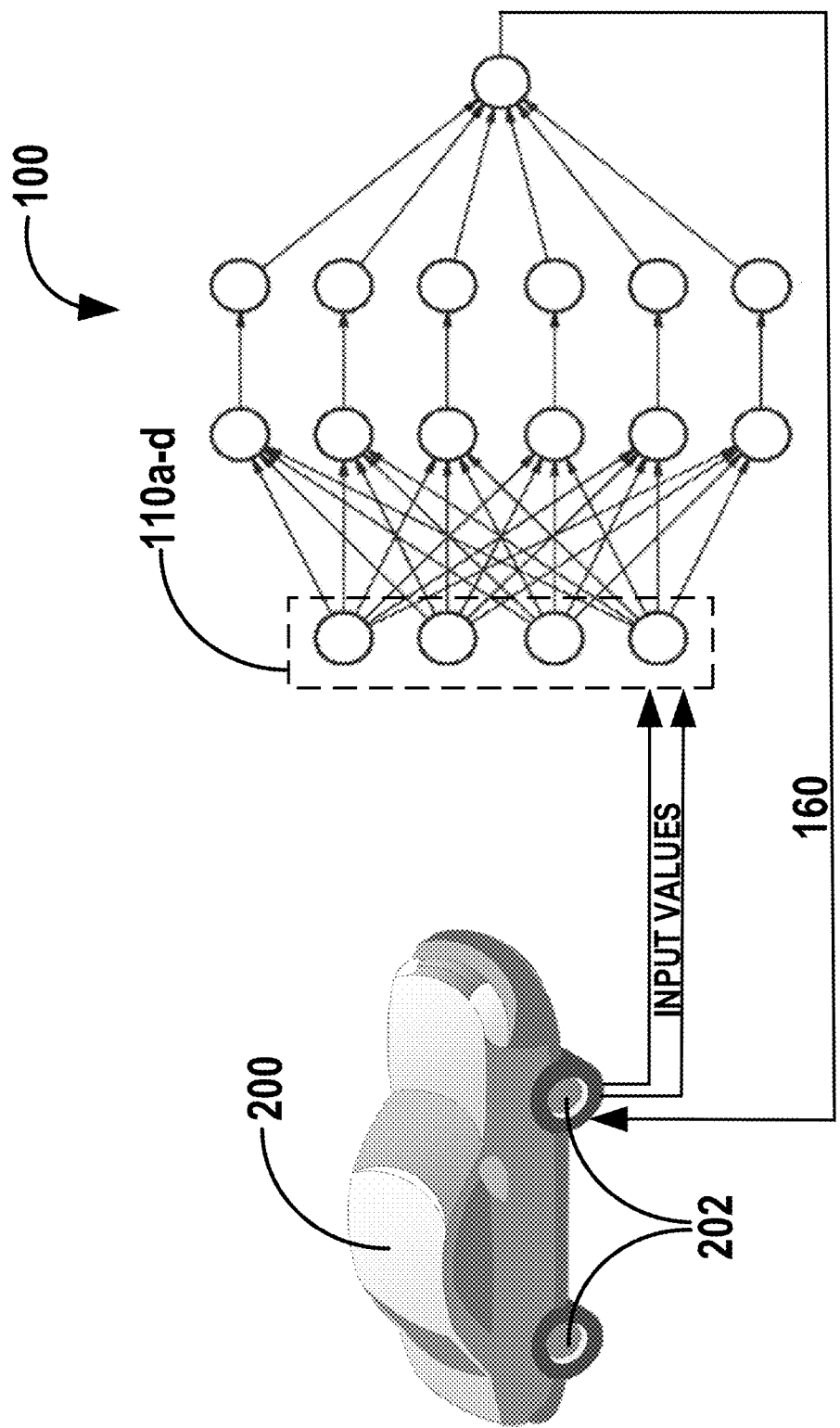
FIG. 2 schematically shows a vehicle whose dynamics are represented by values of parameters provided as inputs to the radial basis function network to obtain a torque change that is implemented by controlling the vehicle dynamics, providing a looped vehicle control.

FIG. 2 shows the radial basis function network 100 providing the torque change 160 in a control of a vehicle 200 based on input values representing dynamics at at least one wheel 202 that are provided to the input layer 110a-d.

What is claimed is:

1. A method of a vehicle automatedly controlling at least one wheel of the vehicle, the method comprising the following steps:
    ascertaining, by a processor of the vehicle and as at least a portion of a set of input values, at least one current slip value of the at least one wheel and at least one current wheel acceleration of the at least one wheel, each of the set of input values being a respective state value (I) for a respective one of a plurality of predefined state variables and (II) determined to be currently present in the vehicle, the set of input values thereby representing a current state of the vehicle;
    inputting, by the processor, the set of input values to a trained radial basis function network; and
    executing, by the processor, the trained radial basis function network with the input set of input values, the trained radial basis function network including:
        an input layer to which the set of input values are input;
        an intermediate hidden layer formed of a plurality of neurons, wherein:
            each of the neurons is positioned at a respective position within a multi-dimensional space formed of a plurality of dimensions;
            each of the plurality of dimensions corresponds to a respective one of the plurality of predefined state variables; and
            for each of the plurality of neurons, a respective value of the respective neuron is set based on a distance of a value vector formed from the set of input values from the position of the respective neuron in the multi-dimensional space; and
        an output layer that combines the values of the neurons, the combination of the values being a required torque change that is output by the output layer; and
    based on the output from the output layer, controlling, automatedly by the processor, at least one of (I) driving dynamics of the vehicle and (II) braking dynamics of the vehicle, thereby effecting the required torque change at the at least one wheel.

2. The method according to claim 1, wherein the input values for the trained radial basis function network to determine the required torque change additionally include a first sequence of previous values of a normal force of the wheel and a second sequence of previous torque values.

3. The method according to claim 1, wherein the input values for the trained radial basis function network include a first sequence of previous values of a normal force of the at least one wheel and a second sequence of previous torque values, and wherein the required torque change is determined by using the radial basis function network trained using the same types of values as the current slip value of the at least one wheel, the current wheel acceleration of the at least one wheel, the first sequence of previous values of the normal force of the at least one wheel and the second sequence of previous torque values.

4. The method according to claim 1, wherein the input values include at least one of:
- a current coefficient of friction of the at least one wheel;
- a current torque of the at least one wheel;
- a running average of the torque of the at least one wheel;
- a current change in torque over time;
- a gradient of the torque of the at least one wheel;
- an average of the torque of the at least one wheel;
- a current torque of at least one other wheel of the vehicle;
- a normal force of at least the at least one wheel and a normal force of the at least one other wheel of the vehicle;
- a difference between the at least one current slip value of the at least one wheel and a target slip value;
- dynamic values of the vehicle;
- a current change in wheel acceleration over time;
- a normal force of the at least one other wheel of the vehicle; and
- a current slip value and at least one current wheel acceleration of the at least one other wheel of the vehicle.

5. The method according to claim 1, wherein the required torque change that is output by the output layer of the radial basis function network is an engine torque change value, and the controlling is of the engine to effect the engine torque change value.

6. The method according to claim 1, further comprising:
- forming training input values using a training wheel-slip value and a training wheel-acceleration value concerning a same wheel that the training wheel-slip value concerns;
- providing and assigning a target torque change associated with the training input values;
- training the radial basis function network with the training input values and the assigned target torque change.

7. The method according to claim 6, wherein the training input values additionally include a sequence of previous values of a normal force of the wheel that the training wheel-slip value concerns and a sequence of previous torque values.

8. The method according to claim 7, wherein each of the training input values are additionally assigned an associated target change in an engine torque, and the radial basis function network is trained with the assigned target torque change and the assigned target change in the engine torque.

9. The method according to claim 7, wherein the radial basis function network is configured based on expert knowledge and/or physical boundary values prior to training.

10. The method according to claim 6, wherein the training input values further include a sequence of previous values of a normal force of the wheel that the training wheel-slip value concerns and a sequence of previous torque values.

11. The method as recited in claim 1, further comprising using the radial basis function network to calibrate a torque controller of the vehicle.

12. The method according to claim 1, wherein the combination of the values incorporates a weighting that differently weights different neurons of the plurality of neurons of the intermediate hidden layer.

13. A control device comprising a processor system of a vehicle, the processor system including at least one processor configured to automatedly control at least one wheel of the vehicle by performing the following:
- ascertaining, as at least a portion of a set of input values, at least one current slip value of the at least one wheel and at least one current wheel acceleration of the at least one wheel, each of the set of input values being a respective state value (I) for a respective one of a plurality of predefined state variables and (II) determined to be currently present in the vehicle, the set of input values thereby representing a current state of the vehicle;
- inputting, by the processor, the set of input values to a trained radial basis function network; and
- executing, by the processor, the trained radial basis function network with the input set of input values, the trained radial basis function network including:
  - an input layer to which the set of input values are input;
  - an intermediate hidden layer formed of a plurality of neurons, wherein:
    - each of the neurons is positioned at a respective position within a multi-dimensional space formed of a plurality of dimensions;
    - each of the plurality of dimensions corresponds to a respective one of the plurality of predefined state variables; and
    - for each of the plurality of neurons, a respective value of the respective neuron is set based on a distance of a value vector formed from the set of input values from the position of the respective neuron in the multi-dimensional space; and
  - an output layer that combines the values of the neurons, the combination of the values being a required torque change that is output by the output layer; and
- based on the output from the output layer, controlling, automatedly by the processor, at least one of (I) driving dynamics of the vehicle and (II) braking dynamics of the vehicle, thereby effecting the required torque change at the at least one wheel.

14. The control device as recited in claim 13, wherein the control device is configured for traction control of the at least one wheel of the vehicle.

* * * * *